(12) United States Patent
Uhrhammer et al.

(10) Patent No.: US 7,674,943 B2
(45) Date of Patent: Mar. 9, 2010

(54) PROPYLENE POLYMER CATALYST DONOR COMPONENT

(75) Inventors: Roger Uhrhammer, Aurora, IL (US); John P. Lalka, Aurora, IL (US)

(73) Assignee: Ineos USA LLC, Lisle, IL (US)

( * ) Notice: Subject to any disclaimer, the term of this patent is extended or adjusted under 35 U.S.C. 154(b) by 0 days.

(21) Appl. No.: 12/080,165

(22) Filed: Apr. 1, 2008

(65) Prior Publication Data

US 2008/0214881 A1    Sep. 4, 2008

(51) Int. Cl.
*C07C 2/02*    (2006.01)
(52) U.S. Cl. ...................... 585/521; 585/524
(58) Field of Classification Search .................. None
See application file for complete search history.

(56) References Cited

U.S. PATENT DOCUMENTS

| | | | |
|---|---|---|---|
| 4,780,443 A * | 10/1988 | Matsuura et al. ............ 502/119 |
| 7,005,487 B2 | 2/2006 | Balbontin et al. |
| 7,253,132 B2 | 8/2007 | Nakayama et al. |
| 2005/0239636 A1 | 10/2005 | Gao et al. |
| 2006/0287446 A1 | 12/2006 | Gao et al. |
| 2007/0021295 A1 | 1/2007 | Morini et al. |
| 2008/0125614 A1 | 5/2008 | Uhrhammer et al. |

OTHER PUBLICATIONS

Ivanchev, S. Russian Chemical Reviews 76(7) 617-637 (2007).

* cited by examiner

*Primary Examiner*—Daniel M Sullivan
*Assistant Examiner*—Clinton Brooks
(74) *Attorney, Agent, or Firm*—James J. Drake; David P. Yusko; Vik Panchal

(57) ABSTRACT

A solid, hydrocarbon-insoluble, catalyst component useful in polymerizing olefins containing magnesium, titanium, and halogen further contains an internal electron donor comprising a compound containing electron donating substituents with a structure:

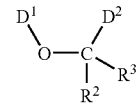

wherein $D^1$ and $D^2$ are selected individually from

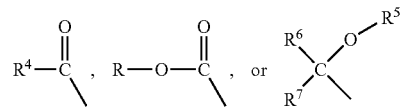

and R, $R^2$, $R^3$, $R^4$, $R^5$, $R^6$, and $R^7$ individually are hydrocarbon or substituted hydrocarbon groups containing 1 to 20 carbon atoms and $R^2$, $R^3$, $R^4$, $R^6$, and $R^7$ may be hydrogen; $R^4$ may be —$NR_2$; and wherein groups $R^1$ and $R^2$, $R^2$ and $R^3$, $R^3$ and $R^4$, $R^3$ and $R^5$, and groups $R^6$ and $R^7$ may be joined to form a cyclic structure.

1 Claim, No Drawings

PROPYLENE POLYMER CATALYST DONOR COMPONENT

CROSS-REFERENCE TO RELATED APPLICATIONS

This application claims the benefit of U.S. Provisional Application No. 60/659,713 filed Mar. 8, 2005, which is incorporated by reference herein.

FIELD OF THE INVENTION

This invention relates to components useful in propylene polymerization catalysts, and particularly relates to electron donor components used in combination with magnesium-containing supported titanium-containing catalyst components.

BACKGROUND OF THE INVENTION

Use of solid, transition metal-based, olefin polymerization catalyst components is well known in the art including such solid components supported on a metal oxide, halide or other salt such as widely-described magnesium-containing, titanium halide-based catalyst components. Such catalyst components are referred to as "supported." Although many polymerization and copolymerization processes and catalyst systems have been described for polymerizing or copolymerizing alpha-olefins, it is advantageous to tailor a process and catalyst system to obtain a specific set of properties of a resulting polymer or copolymer product. For example, in certain applications, a combination of acceptably high activity, good morphology, desired particle size distribution, acceptable bulk density, and the like are required together with polymer characteristics such as stereospecificity, molecular weight distribution, and the like.

Typically, supported catalyst components useful for polymerizing propylene and higher alpha-olefins as well as for polymerizing propylene and higher olefins with minor amounts of ethylene and other alpha-olefins contain an electron donor component as an internal modifier. Such internal modifier is an integral part of the solid supported component and is distinguished from an external electron donor component, which together with an aluminum alkyl component, comprises the catalyst system. Typically, the external modifier and aluminum alkyl are combined with the solid supported component shortly before the combination is contacted with an olefin monomer or in the presence of olefin monomer.

Selection of the internal modifier can affect catalyst performance and the resulting polymer formed from a catalyst system. Generally, organic electron donors have been described as useful in preparation of the stereospecific supported catalyst components including organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors have been described as useful in incorporating into supported catalyst components. Examples of organic electron donors include dicarboxy esters such as alkyl phthalate and succinate esters.

In current practice, alkyl phthalate esters are commonly used as an electron donor internal modifier in commercial propylene polymerization catalyst systems. However, certain environmental questions have been raised concerning continued use of phthalate derivatives in human contact applications.

Numerous individual processes or process steps have been disclosed to produce improved supported, magnesium-containing, titanium-containing, electron donor-containing olefin polymerization or copolymerization catalysts. For example, Arzoumanidis et al., U.S. Pat. No. 4,866,022, incorporated by reference herein, discloses a method for forming an advantageous alpha-olefin polymerization or copolymerization catalyst or catalyst component which involves a specific sequence of specific individual process steps such that the resulting catalyst or catalyst component has exceptionally high activity and stereospecificity combined with very good morphology. A solid hydrocarbon-insoluble, alpha-olefin polymerization or copolymerization catalyst or catalyst component with superior activity, stereospecificity and morphology characteristics is disclosed as comprising the product formed by 1) forming a solution of a magnesium-containing species from a magnesium hydrocarbyl carbonate or magnesium carboxylate; 2) precipitating solid particles from such magnesium-containing solution by treatment with a transition metal halide and an organosilane; 3) reprecipitating such solid particles from a mixture containing a cyclic ether; and 4) treating the reprecipitated particles with a transition metal compound and an electron donor.

Arzoumanidis et al., U.S. Pat. No. 4,540,679, incorporated by reference herein, discloses a process for the preparation of a magnesium hydrocarbyl carbonate by reacting a suspension of a magnesium alcoholate in an alcohol with carbon dioxide and reacting the magnesium hydrocarbyl carbonate with a transition metal component.

Arzoumanidis et al., U.S. Pat. No. 4,612,299, incorporated by reference herein, discloses a process for the preparation of a magnesium carboxylate by reacting a solution of a hydrocarbyl magnesium compound with carbon dioxide to precipitate a magnesium carboxylate and reacting the magnesium carboxylate with a transition metal component.

Particular uses of propylene polymers depend upon the physical properties of the polymer, such as molecular weight, viscosity, stiffness, flexural modulus, and polydispersity index (molecular weight distribution ($M_w/M_n$)). In addition, polymer or copolymer morphology often is critical and typically depends upon catalyst morphology. Good polymer morphology generally involves uniformity of particle size and shape, resistance to attrition and an acceptably high bulk density. Minimization of very small particles (fines) typically is important especially in gas-phase polymerizations or copolymerizations in order to avoid transfer or recycle line pluggage.

The invention described relates to use of an internal modifier in a propylene polymerization catalyst component, which does not contain a phthalate derivative.

SUMMARY OF THE INVENTION

A solid, hydrocarbon-insoluble, catalyst component useful in polymerizing olefins containing magnesium, titanium, and halogen further contains an internal electron donor comprising a compound containing electron donating substituents with a structure:

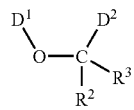

wherein $D^1$ and $D^2$ are selected individually from

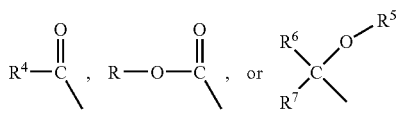

and R, $R^2$, $R^3$, $R^4$, $R^5$, $R^6$, and $R^7$ individually are hydrocarbon or substituted hydrocarbon groups containing 1 to 20 carbon atoms and $R^2$, $R^3$, $R^4$, $R^6$, and $R^7$ may be hydrogen; $R^4$ may be —$NR_2$; and wherein groups $R^2$ and $R^3$, $R^3$ and $R^4$, $R^3$ and $R^5$, and groups $R^6$ and $R^7$ may be joined to form a cyclic structure.

DESCRIPTION OF THE INVENTION

Supported catalyst components of this invention contain at least one internal electron donor comprising a derivative containing electron donating substituents with a structure:

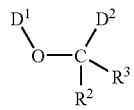

wherein $D^1$ and $D^2$ are selected individually from

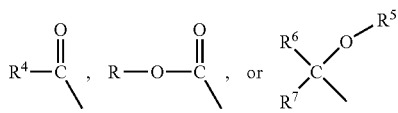

and R, $R^2$, $R^3$, $R^4$, $R^5$, $R^6$, and $R^7$ individually are hydrocarbon or substituted hydrocarbon groups containing 1 to 20 carbon atoms and $R^2$, $R^3$, $R^4$, $R^6$, and $R^7$ may be hydrogen; $R^4$ may be —$NR_2$; and wherein groups $R^1$ and $R^2$, $R^2$ and $R^3$, $R^3$ and $R^4$, $R^3$ and $R^5$, and groups $R^6$ and $R^7$ may be joined to form a cyclic structure.

In one aspect of this invention, typical electron donor compounds of this invention are alkyl esters of a derivative illustrated above, in which donor group $D^2$ is an alkyl carboxylic acid ester. For this invention, alkyl groups include cycloalkyl groups such as cyclohexyl. Such alkyls typically contain at least two and preferably at least three carbon atoms. Suitable alkyls also may contain up to 12 and, typically, up to 8 carbon atoms. Other suitable alkyls contain from 4 to 6 carbon atoms. Typical examples of alkyl esters useful in this invention include ethyl, propyl, isopropyl, n-butyl, isobutyl, s-butyl, t-butyl, n-pentyl, isopentyl, hexyl, 2-ethylhexyl, cyclohexyl, cyclopentyl, and octyl esters. Especially suitable alkyls are isopropyl, n-butyl, s-butyl, and t-butyl. In this aspect of the invention, donor group $D^1$ typically is an acyl, carboxylic acid ester, or oxy group as illustrated above. Typical acyl groups ($R^4$CO—) include alkyl, alkylaryl, arylalkyl, and aryl-substituted acyl groups. $C_1$-$C_{20}$ alkyl substituted acyl groups are preferred, with $C_2$-$C_8$ alkyl most preferred. A typical example of a suitable arylalkyl group is benzyl. Typical oxy groups ($R^5$O—) include alkyloxy, alkylaryloxy, arylalkyloxy, and aryloxy groups in which $R^5$ contains 1 to 20 carbon atoms with 2 to 8 carbon atoms preferred.

In other embodiments of this invention, hydrocarbyl substituents ($R^2$ and $R^3$) also include alkyl, alkylaryl, arylalkyl, and aryl-substituted acyl groups containing 1 to 20 carbon atoms with 1 to 8 carbon atoms preferred. Alkyl groups ($R^2$ and $R^3$) may be joined to form cyclic structures with 4 to 7 (preferably 5 to 6) atom cyclic structures preferred.

In another embodiment of this invention, substituents $R^6$ and $R^7$ may contain 1 to 20 carbon atoms with 1 to 8 carbon atoms preferred and alkyl substituents may be joined to form cyclic structures with 4 to 7 (preferably 5 to 6) atom cyclic structures preferred.

In another embodiment of this invention, substituents $R^3$ and $R^5$ may contain 1 to 20 carbon atoms with 1 to 8 carbon atoms preferred and alkyl substituents may be joined to form cyclic structures with 4 to 7 (preferably 5 to 6) atom cyclic structures preferred.

Cyclic structures also may contain heteroatoms such as nitrogen and/or oxygen and may contain internal unsaturation.

Although, the alkyl groups forming alkyl dicarboxylic acid esters of this invention may be the same, the invention includes alkyl dicarboxylic acid esters having different alkyl groups.

In more detail, preferably, R and $R^5$ are not hydrogen and typically $R^4$ is not hydrogen, and $R^4$ also may be —$NR_2$.

Alkyl groups used in this invention also may be substituted with compatible groups containing heteroatoms including nitrogen, phosphorus, silicon, and halogens. Thus, a hydrocarbon group used in this invention may be substituted with an amine, amide, chloro, bromo, or silyl group. Cyclic structures which may be incorporated into donor compounds may contain hetero atoms, such as nitrogen, silicon, and phosphorus.

Representative examples of donor compounds of this invention include derivatives of phenylacetoxyacetates ($D^2$=alkyl carboxylic ester group and $R^1$=phenyl(Ph)) such as an alkyl ethyl phenylacetoxyacetate. Typically, the alkyl group (R) contains 1 to 8 carbon atoms and preferably includes ethyl, propyl, isopropyl, n-butyl, isobutyl, and s-butyl. The donor substituent $D^1$ in these structures includes "t-butoxycarbonyl" or the t-butyl ester of a carboxylic acid group (R=t-butyl), which sometimes is represented as "Boc" or "BOC" in structural formulas. Other donor compounds of this invention with similar structures include $D^1$ substituents wherein the carboxylic acid ester derivative preferably has R contain 1 to 10 carbon atoms and includes alkyl having 1 to 8 carbon atoms and arylalkyl groups typically containing at least about 7 and may contain up to about 20, preferably up to 15, carbon atoms such as benzyl ("Bn") or a substituted benzyl group.

In many aspects, the donor compounds of this invention are described as derivatives of alpha hydroxy carboxylic acids.

Examples of structures (with hydrogens not shown) included in this invention include:

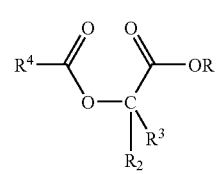

1

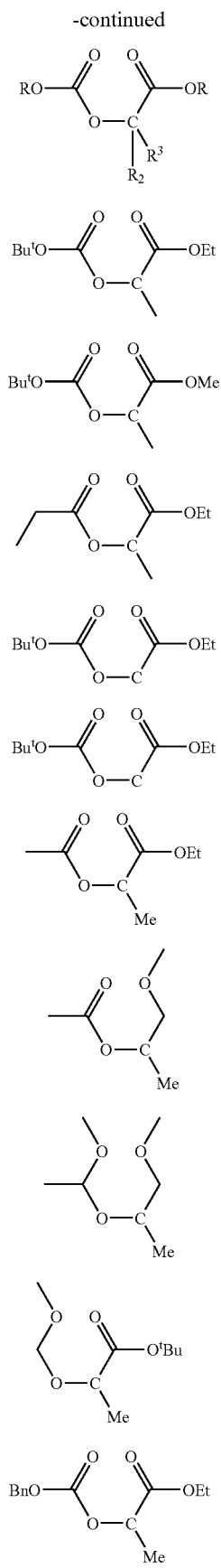
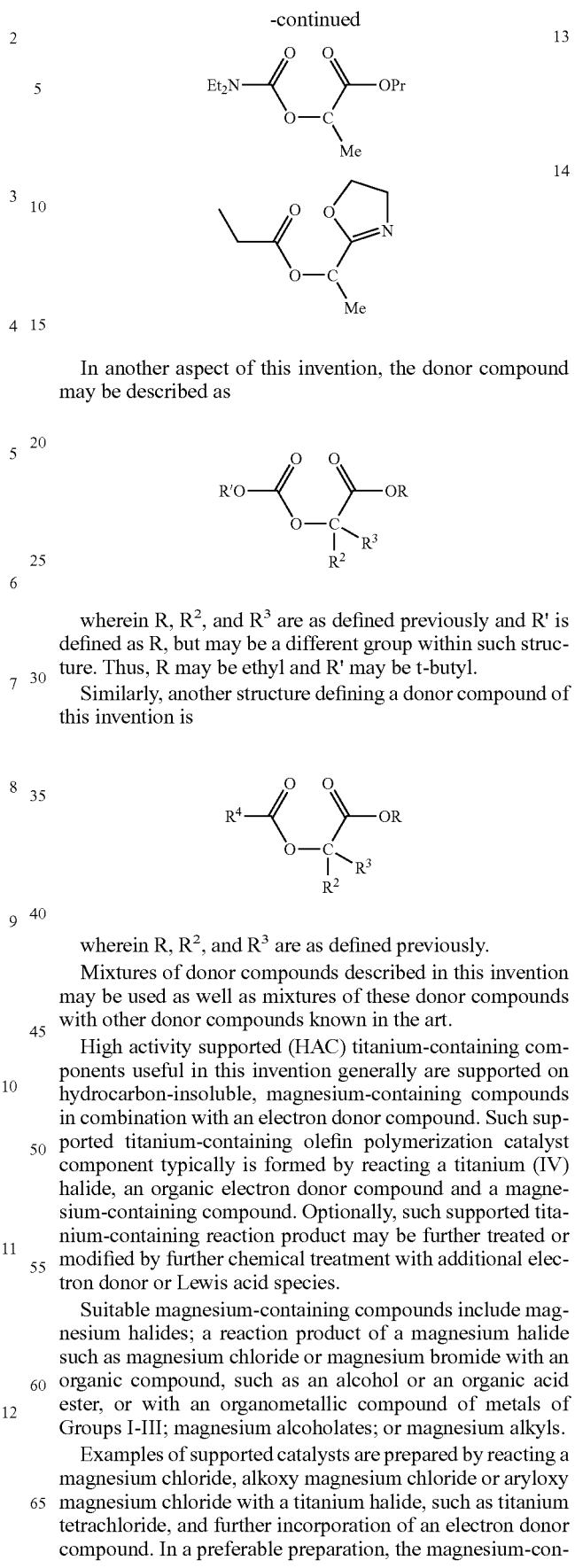

In another aspect of this invention, the donor compound may be described as wherein R, $R^2$, and $R^3$ are as defined previously and R' is defined as R, but may be a different group within such structure. Thus, R may be ethyl and R' may be t-butyl.

Similarly, another structure defining a donor compound of this invention is wherein R, $R^2$, and $R^3$ are as defined previously.

Mixtures of donor compounds described in this invention may be used as well as mixtures of these donor compounds with other donor compounds known in the art.

High activity supported (HAC) titanium-containing components useful in this invention generally are supported on hydrocarbon-insoluble, magnesium-containing compounds in combination with an electron donor compound. Such supported titanium-containing olefin polymerization catalyst component typically is formed by reacting a titanium (IV) halide, an organic electron donor compound and a magnesium-containing compound. Optionally, such supported titanium-containing reaction product may be further treated or modified by further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups I-III; magnesium alcoholates; or magnesium alkyls.

Examples of supported catalysts are prepared by reacting a magnesium chloride, alkoxy magnesium chloride or aryloxy magnesium chloride with a titanium halide, such as titanium tetrachloride, and further incorporation of an electron donor compound. In a preferable preparation, the magnesium-containing compound is dissolved, or is in a slurry, in a compatible liquid medium, such as a hydrocarbon to produce suitable catalyst component particles.

The possible solid catalyst components listed above only are illustrative of many possible solid, magnesium-containing, titanium halide-based, hydrocarbon-insoluble catalyst components useful in this invention and known to the art. This invention is not limited to a specific supported catalyst component.

In a typical supported catalyst of this invention, the magnesium to titanium atom ratio typically is above about 0.5 to 1 and may range to about 20 to 1. Greater amounts of magnesium may be employed without adversely affecting catalyst component performance, but typically there is no need to exceed a magnesium to titanium ratio of about 20:1. More preferably, the magnesium to titanium ratio ranges from about 2:1 to about 15:1. The internal electron donor components typically are incorporated into the solid, supported catalyst component in a total amount ranging up to about 1 mole per gram atom of titanium in the titanium compound, and preferably from about 0.001 to about 0.6 mole per gram atom of titanium in the titanium compound. Typical amounts of internal donor are at least 0.01 mole per gram atom of titanium, preferably above about 0.05 and typically above about 0.1 mole per gram atom of titanium. Also, typically, the amount of internal donor is less than 1 mole per gram atom of titanium, and preferably below about 0.5, and more preferably below about 0.3 mole per gram atom of titanium.

Supported catalyst components known to the art may be used with the internal donors described in this invention. Typically, the internal electron donor material of this invention is incorporated into a solid, supported catalyst component during formation of such component. Typically, such electron donor material is added with, or in a separate step, during treatment of a solid magnesium-containing material with a titanium (IV) compound. Most typically, a solution of titanium tetrachloride and the internal electron donor modifier material is contacted with a magnesium-containing material. Such magnesium-containing material typically is in the form of discrete particles and may contain other materials such as transition metals and organic compounds. Also, a mixture of magnesium chloride, titanium tetrachloride and the internal donor may be formed into an active catalyst component by ball-milling.

The preferred solid, hydrocarbon-insoluble catalyst or catalyst component of this invention for the stereoregular polymerization or copolymerization of alpha-olefins comprises the product formed by a process, which comprises a first step of forming a solution of a magnesium-containing species in a liquid wherein the magnesium-containing species is formed by reacting a magnesium-containing compound with carbon dioxide or sulfur dioxide. The magnesium-containing compound from which the magnesium-containing species is formed is a magnesium alcoholate, a magnesium hydrocarbyl alcoholate, or a hydrocarbyl magnesium compound. When carbon dioxide is used, the magnesium-containing species is a hydrocarbyl carbonate or a carboxylate. When sulfur dioxide is employed, the resulting magnesium-containing species is a hydrocarbyl sulfite ($ROSO_2^-$) or an hydrocarbyl sulfinate ($RSO_2^-$). Preferable catalyst components are prepared in a manner similar to those described in U.S. Pat. No. 4,946,816, incorporated by reference herein.

Generally, magnesium hydrocarbyl carbonate is prepared by reacting carbon dioxide with a magnesium alcoholate. For example, magnesium hydrocarbyl carbonate is formed by suspending magnesium ethoxide in ethanol and adding carbon dioxide until the magnesium ethoxide dissolves forming magnesium ethyl carbonate. If, however, the magnesium ethoxide were suspended in 2-ethylhexanol, magnesium 2-ethylhexyl carbonate, magnesium ethyl carbonate and magnesium ethyl/2-ethylhexyl carbonate may be formed. If the magnesium ethoxide is suspended in a liquid hydrocarbon or halohydrocarbon which is free of alcohol, the addition of carbon dioxide results in the breaking apart of the magnesium ethoxide particles and the magnesium hydrocarbyl carbonate reaction product does not dissolve. The reaction of a magnesium alcoholate with carbon dioxide can be represented as:

wherein n is a whole number or fraction up to 2, and wherein R is a hydrocarbyl group of 1 to 20 carbon atoms. In addition, a magnesium alcoholate-containing two different aforesaid hydrocarbyl groups may be employed. From the standpoint of cost and availability, magnesium alcoholates which are preferred for use according to this invention are those of the formula $Mg(OR)_2$ wherein R is as defined below. In terms of catalytic activity and stereospecificity, best results are achieved through the use of magnesium alcoholates of the formula $Mg(OR')_2$ wherein R' is an alkyl radical of 1 to about 8 carbon atoms, an aryl radical of 6 to about 12 carbon atoms or an alkaryl or aralkyl radical of 7 to about 12 carbon atoms. Magnesium ethoxide is most preferred.

Specific examples of magnesium alcoholates that are useful according to this invention include: $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{18}H_{37})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, $Mg(OC_2H_4Cl)_2$ and $Mg(OC_{16}H_{33})(OC_{18}H_{37})$. Mixtures of magnesium alcoholates also may be used if desired.

A suitable magnesium hydrocarbyl alcoholate has the formula MgR(OR') wherein R and R' are as defined hereinabove for the magnesium alcoholate. When alcohol is used as the suspending medium for the reaction between the magnesium hydrocarbyl alcoholate and carbon dioxide or sulfur dioxide, the magnesium hydrocarbyl alcoholate is a functional equivalent of the magnesium alcoholate because the magnesium hydrocarbyl alcoholate is converted to the magnesium alcoholate in alcohol. However, when the suspending medium does not contain alcohol, the magnesium hydrocarbyl alcoholate reacts with carbon dioxide as:

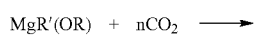
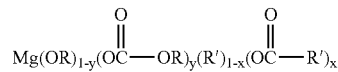

wherein $y+x=n\geq 2$ and $y=0$ for $x=n\leq 1.0$.

In the case of

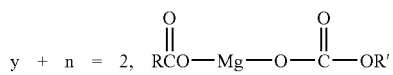

is the resulting magnesium-containing species.

When the magnesium compound from which the magnesium-containing species is formed is a hydrocarbyl magnesium compound having the formula XMgR, where X is a halogen and R is a hydrocarbyl group of 1 to 20 carbon atoms, the reaction of the hydrocarbyl magnesium compound with carbon dioxide forms a magnesium carboxylate and can be represented as follows:

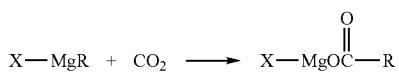

If the hydrocarbyl magnesium compound contains two hydrocarbyl groups, the reaction is represented as:

where R is as defined for X—MgR.

The hydrocarbyl magnesium compounds useful in this invention have the structure R—Mg-Q wherein Q is hydrogen, halogen or R' (each R' is independently a hydrocarbyl group of 1 to 20 carbon atoms.) Specific examples of hydrocarbyl magnesium compounds useful in this invention include: $Mg(CH_3)_2$, $Mg(C_2H_5)_2$, $Mg(C_4H_9)_2$, $Mg(C_6H_5)_2$, $Mg(C_6H_{13})_2$, $Mg(C_9H_{19})_2$, $Mg(C_{10}H_7)_2$, $Mg(C_{12}H_9)_2$, $Mg(C_{12}H_{25})_2$, $Mg(C_{16}H_{33})_2$, $Mg(C_{20}H_{41})_2$, $Mg(CH_3)(C_2H_5)$, $Mg(CH_3)(C_6H_{13})$, $Mg(C_2H_5)(C_8H_{17})$, $Mg(C_6H_{13})(C_{20}H_{41})$, $Mg(C_3H_7)(C_{10}H_7)$, $Mg(C_2H_4Cl)_2$ and $Mg(C_{16}H_{33})(C_{18}H_{37})$, $Mg(C_2H_5)(H)$, $Mg(C_2H_5)(Cl)$, $Mg(C_2H_5)(Br)$, etc. Mixtures of hydrocarbyl magnesium compounds also can be employed if desired. From the standpoint of cost and availability, dihydrocarbyl magnesium compounds preferred for use in this invention are those of the formula $MgR_2$ wherein R is as defined above. In terms of catalytic activity and stereospecificity, best results are achieved through the use of hydrocarbyl magnesium halide compounds of the formula MgR'Q' wherein R' is an alkyl radical of 1 to about 18 carbon atoms, an aryl radical of 6 to about 12 carbon atoms or an alkaryl or aralkyl radical of 7 to about 12 carbon atoms and Q' is chloride or bromide.

Most preferably, the magnesium-containing compound is a magnesium alcholate, and the resulting magnesium-containing species is a magnesium hydrocarbyl carbonate.

For example, a magnesium alcholate may be used which is prepared by reacting magnesium metal turnings to completion with a lower molecular weight alcohol, such as methanol, ethanol, or 1-propanol, with or without a catalyst such as iodine or carbon tetrachloride, to form a solid magnesium alcholate. Any excess alcohol is removed by filtration, evaporation or decantation. Use as the magnesium-containing compound of a magnesium alcholate produced in this manner affords a solution of the magnesium-containing species which has a substantially reduced viscosity.

Diluents or solvents suitable for use in the carbonation of the magnesium compounds to form the magnesium-containing species include alcohols containing from 1 to 12 carbon atoms, non-polar hydrocarbons and halogenated derivatives thereof, ethers and mixtures thereof that are substantially inert to the reactants employed and, preferably, are liquid at the temperatures of use. It also is contemplated to conduct the reaction at elevated pressure so that lower-boiling solvents and diluents can be used even at higher temperatures. Examples of useful solvents and diluents include alcohols such as methanol, ethanol, 1- or 2-propanol, t-butyl alcohol, benzyl alcohol, the amyl alcohols, 2-ethylhexanol and branched alcohols containing 9 or 10 carbon atoms; alkanes such as hexane, cyclohexane, ethylcyclohexane, heptane, octane, nonane, decane, undecane, and the like; haloalkanes such as 1,1,2-trichloroethane, carbon tetrachloride, and the like; aromatics such as toluene, xylenes and ethylbenzene; and halogenated and hydrogenated aromatics such as chlorobenzene, o-dichlorobenzene, tetrahydronaphthalene and decahydronaphthalene.

The solution of the magnesium-containing species typically comprises at least one monohydroxy alcohol containing from 2 to about 18 carbon atoms, preferably at a ratio of the total number of moles of the at least one alcohol to the number of moles of the aforesaid magnesium-containing compound in the range of from about 1.45:1, more preferably from about 1.6:1, to about 2.3:1, more preferably to about 2.1:1. Alcohols that are suitable for use in the present invention include those having the structure HOR wherein R is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used, such as ethanol, 1- or 2-propanol, t-butyl alcohol, cyclohexanol, 2-ethylhexanol, amyl alcohols including isoamyl alcohol, and branched alcohols having 9 to 12 carbon atoms. Preferably, 2-ethylhexanol or ethanol is employed.

In somewhat greater detail, the magnesium-containing species is prepared by dissolving or suspending the magnesium-containing compound in a liquid. Approximately 10 to 80 parts by weight of the magnesium-containing compound is employed per 100 parts by weight liquid. A sufficient amount of carbon dioxide is bubbled into the liquid suspension to provide from about 0.1 to 4 moles of carbon dioxide per mole of the magnesium compound with mild stirring. Typically, approximately 0.3 to 4 moles of $CO_2$ are added to the solution or suspension of the magnesium-containing compound with stirring at a temperature of about 0 to 100° C. over a period of approximately 10 minutes to 24 hours.

Irrespective of which of the aforesaid magnesium-containing compounds is used to form the magnesium-containing species, solid particles are precipitated from the aforesaid solution of the magnesium-containing species by treatment with a transition metal or Group IV halide and preferably additionally with a morphology controlling agent. The transition metal or Group IV halide preferably is a titanium (IV) or silicon halide and more preferably is titanium tetrachloride. While any convenient conventional morphology controlling agent can be employed, organosilanes are particularly suitable for use as the morphology controlling agent. Suitable organosilanes for this purpose include those having a formula: $R_nSiR'_{4-n}$, wherein n=0 to 4 and wherein R is hydrogen or an alkyl, alkoxy, haloalkyl or aryl radical containing one to about ten carbon atoms, or a halosilyl radical or haloalkylsilyl radical containing one to about eight carbon atoms, and R' is OR or a halogen. Typically, R is an alkyl or chloroalkyl radical containing one to about eight carbon atoms and one to about four chlorine atoms, and R' is chlorine or an —OR radical containing one to four carbon atoms. A suitable organosilane may contain different R' groups. Mixtures of organosilanes may be used. Preferable organosilanes include trimethylchlorosilane, trimethylethoxysilane, dimethyldichlorosilane, methyltrichlorosilane, tetraethoxysilane, tetrachlorosilane, and hexamethyldisiloxane. Typically, one or more alcohols containing from 1 to 12 carbon atoms may be added, such as ethanol, 1- or 2-propanol, t-butyl alcohol, cyclohexanol, 2-ethylhexanol, amyl alcohols including isoamyl alcohol, and branched alcohols having 9 to 12 carbon atoms. Preferably, 2-ethylhexanol or ethanol is employed.

Broadly, in accordance with this invention, the precipitated particles are treated with a transition metal compound and an electron donor. Suitable transition metal compounds which can be used for this purpose include, compounds represented by the formula $T_a Y_b X_{c-b}$ wherein $T_a$ is a transition metal selected from Groups IV-B, V-B and VI-B of the Periodic Table of Elements, Y is oxygen, OR' or NR'$_2$; wherein each R' is independently hydrogen or hydrocarbyl group of 1 to 20 carbon atoms; X is halogen, preferably chlorine or bromine; c has a value corresponding to the valence of the transition metal, $T_a$; b has a value of from 0 to 5 with a value of c-b being from at least 1 up to the value of the valence state of the transition metal $T_a$. Suitable transition metal compounds include halide compounds of titanium, zirconium, vanadium and chromium, such as chromyl chloride, vanadium oxytrichloride, zirconium tetrachloride, vanadium tetrachloride, and the like.

In addition to supported catalyst components formed from magnesium alcoholates or magnesium hydrocarbyl carbonates as described above, other magnesium-containing supported components may be produced by reacting titanium halide-containing compounds with magnesium halides, such as magnesium chloride, magnesium oxyhalides, magnesium alkoxides, and the like. In preparation of suitable supported catalysts useful for olefin polymerization, an electron donor material is added during formation of such component in which a magnesium compound is reacted with a titanium halide-containing compound as described in the art. Irrespective of the method of formation, the supported catalyst components of this invention include the internal electron donor material described in this invention.

Titanium (IV) compounds useful in preparation of the catalyst or catalyst component of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired. Preferred titanium compounds are the halides and haloalcoholates having 1 to 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

The particles formed as described above, the titanium halide component, and the electron donor components described in this invention are reacted at temperatures ranging from about −10° C. to about 170° C., generally over a period of several minutes to several hours.

Preferably, the aforesaid electron donor compounds and titanium compound is contacted with the precipitated solid particles in the presence of an inert hydrocarbon or halogenated diluent, although other suitable techniques can be employed. Suitable diluents are substantially inert to the components employed and are liquid at the temperature and pressure employed.

Preferably, although optional, the precipitated particles are reprecipitated from a solution containing, typically, a cyclic ether, and then the reprecipitated particles are treated with a transition metal compound and an electron donor as described above In a typical reprecipitation procedure, the precipitated particles are entirely solubilized in a cyclic ether solvent and then particles are allowed to reprecipitate to form particles of uniform size. The preferable ether is tetrahydrofuran, although other suitable cyclic ethers, such as tetrahydropyran and 2-methyltetrahydrofuran, may be used, which can solubilize the particles. Also, thioethers such as tetrahydrothiophene can be used. In some instances, such as the use of 2,2,5,5-tetrahydrofuran and tetrahydropyran-2-methanol, reprecipitation occurs upon heating to about 55°-85° C. Other compounds may be used which act in an equivalent manner, i.e., materials which can solubilize the particles formed in Step B and from which solid uniform particles can be reprecipitated, such as cyclohexene oxide, cyclohexanone, ethyl acetate and phenyl acetate. Mixtures of such suitable materials may also be used.

A suitable diluent that can be used in any of the aforesaid steps should be substantially inert to the reactants employed and preferably is liquid at the temperatures and pressures used. A particular step may be conducted at an elevated pressure so that lower boiling diluents can be used at higher temperatures. Typical suitable diluents are aromatic or substituted aromatic liquids, although other hydrocarbon-based liquids may be used. Aromatic hydrocarbons, such as toluene, and substituted aromatics are useful. An especially suitable diluent is a halogenated aromatic such as chlorobenzene or a mixture of a halogenated aromatic such as chlorobenzene and a halogenated aliphatic such as dichloroethane. Also useful are higher boiling aliphatic liquids such as kerosene. Mixtures of diluents may be used. One useful diluent component is Isopar G® which is a $C_{10}$-average isoparaffinic hydrocarbon boiling at 156-176° C. Other examples of useful diluents include alkanes such as hexane, cyclohexane, methylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

Each of the aforesaid preparative steps is conducted in the substantial absence of water, oxygen, carbon monoxide, and other extraneous materials capable of adversely affecting the performance of the catalyst or catalyst component of this invention. Such materials are conveniently excluded by carrying out the procedures in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1,4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or purifying other reagents.

As a result of the above-described preparation steps, there is obtained a solid reaction product suitable for use as a catalyst or catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

The final solid reaction product prepared may be contacted one or more times with at least one Lewis acid prior to polymerization. Such Lewis acids useful according to this invention are materials which are liquid or soluble in a liquid diluent at treatment temperatures and have Lewis acidity high enough to remove impurities such as unreacted starting materials and poorly affixed compounds from the surface of the solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the final solid reaction product may be washed with an inert liquid hydrocarbon or halogenated hydrocarbon before contact with a Lewis acid. If such a wash is conducted, it is preferred to substantially remove the inert liquid prior to contacting the washed solid with Lewis acid.

In an advantageous procedure, the magnesium chloride-based particles are treated with titanium tetrachloride and then with titanium tetrachloride in the presence of the mixture of electron donors one or more times. More preferably, the product is treated one or more times with a liquid aromatic hydrocarbon such as toluene and finally with titanium tetrachloride again. Such treatments are performed at elevated temperatures, typically from 75 to 135° C. at normal or slightly elevated pressures from 1 to 3 bar for three to six times. Typical individual treatment times may vary from several minutes to several hours, usually from 0.25 to 3 hours.

In an embodiment of this invention, a mixture of electron donors is incorporated into the supported catalyst component comprising a first electron donor and an additional electron donor. The first electron donor is selected from the group of electron donors described above as representing the class of electron donors of this invention. The second electron donor is a dialkylphthalate wherein each alkyl group may be the same or different and contains from 3 to 5 carbon atoms. The additional electron donor is preferably a dibutylphthalate and more preferably is di-n-butylphthalate or di-1-butylphthalate. The mole ratio of the additional electron donor to the first electron donor may range from about 0.1:1 to about 20:1, preferably from about 0.3:1 to about 1:1.

Also, the internal electron donor material useful in this invention may be combined with additional electron donors such as a polyhydrocarbyl phosphonate, phosphinate, phosphate or phosphine oxide or an alkyl aralkylphthalate, wherein the alkyl moiety contains from 2 to 10, preferably 3 to 6, carbon atoms and the aralkyl moiety contains from 7 to 10, preferably to 8, carbon atoms, or an alkyl ester of an aromatic monocarboxylic acid wherein the monocarboxylic acid moiety contains from 6 to 8 carbon atoms and the alkyl moiety contains from 1 to 3 carbon atoms.

Useful polyhydrocarbyl phosphonates, phosphinates, phosphates, or phosphine oxides include:

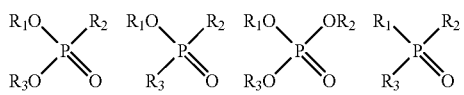

wherein each hydrocarbyl group ($R_1$, $R_2$, and $R_3$) may be the same or different and may be alkyl or aryl, and each contains from 1 to 12 carbon atoms Preferably each hydrocarbyl group ($R_1$, $R_2$ and $R_3$) is an alkyl group. Preferably a phosphonate is employed. Particular phosphonates that are suitable for use as an aforesaid preferable component include dimethyl methylphosphonate, diethyl ethylphosphonate, diisopropyl methylphosphonate, dibutylbutylphosphonate, and di(2-ethylhexyl) 2-ethylhexyl phosphonate.

The additional component also may be a dialkylphthalate wherein each alkyl moiety may be the same or different and each contains at least 6 carbon atoms, preferably up to 10 atoms. Particular dialkylphthalates which are suitable for use as an additional electron donor include dihexylphthalate and dioctylphthalate.

Also, the additional component may be an alkyl ester of an aliphatic monocarboxylic acid wherein carboxylic acid moiety contains 2 to 20, preferably 3 to 6, carbon atoms and the alkyl moiety contains from 1 to 3 carbon atoms. Particular alkyl esters that are suitable for use as the aforesaid first electron donor include methyl valerate, ethyl pivalate, methyl pivalate, methyl butyrate, and ethyl propionate.

In another alternative, the additional component may be a dicycloaliphatic ester of an aromatic dicarboxylic acid wherein each cycloaliphatic moiety may be the same or different and each contains from 5 to 7 carbon atoms, and preferably contains 6 carbon atoms. Preferably the ester is a dicycloaliphatic diester of an ortho aromatic dicarboxylic acid. Particular dicycloaliphatic esters that are suitable for use as the aforesaid first electron donor include dicyclopentylphthalate, dicyclohexylphthalate, and di-(methylcyclopentyl)-phthalate.

The additional component may be an alkyl aralkyl phthalate wherein the alkyl moiety contains 2 to 10, preferably 3 to 6, carbon atoms, and the aralkyl moiety contains from 7 carbon atoms up to 10, preferably up to 8, carbon atoms. Particularly, alkyl aralkyl phthalates suitable for use as an additional component include benzyl n-butyl phthalate and benzyl i-butyl phthalate. In another alternative, such additional component also may be an alkyl ester of an aromatic monocarboxylic acid wherein the monocarboxylic acid moiety contains from 6 to 8 carbon atoms and the alkyl moiety contains from 1 to 3 carbon atoms. Particular alkyl esters that are suitable for use as an additional component include methyl toluate, ethyl toluate, methyl benzoate, ethyl benzoate and propyl benzoate.

The mole ratio of first electron donor component described in this invention to the additional component is in the range of from about 0.5:1, preferably from about 1:1, to about 3:1, preferably to about 2.5:1. The mole ratio of the aforesaid second electron donor to the combination of the first electron donor and the additional electron donor ranges from about 4:1, preferably from about 7:1, to about 15:1, preferably to about 9:1.

Although the chemical structure of the catalyst or catalyst components of this invention is not known precisely, the components generally comprise from about 1 to about 6 weight percent titanium, from about 10 to about 25 weight percent magnesium, and from about 45 to about 65 weight percent halogen. Preferably, the catalyst component of this invention comprise from about 2.0 to about 4 weight percent titanium, from about 15 to about 21 weight percent magnesium and from about 55 to about 65 weight percent chlorine.

In the solid catalyst component of this invention produced by the method of this invention, the atomic ratio of magnesium to titanium is at least about 0.3:1 and preferably, is from about 0.4:1 to about 20:1 and more preferably, from about 3:1 to about 9:1.

Prepolymerization or encapsulation of the catalyst or catalyst component of this invention also may be carried out prior to being used in the polymerization or copolymerization of alpha olefins. A particularly useful prepolymerization procedure is described in U.S. Pat. No. 4,579,836, which is incorporated herein by reference.

Typically, the catalyst or catalyst component of this invention is used in conjunction with a cocatalyst component including a Group II or III metal alkyl and, typically, one or more modifier compounds. Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_6H_{13})_3$, and $Al(C_{12}H_{25})_3$. A magnesium, zinc, or aluminum alkyl containing 1 to about 6 carbon atoms per alkyl radical may be used. Aluminum alkyls are preferred and most preferably trialkylaluminums containing 1 to about 6 carbon atoms per alkyl radical, and particularly triethylaluminum and triisobutylaluminum or a combination thereof are used.

If desired, metal alkyls having one or more halogen or hydride groups can be employed, such as ethylaluminum dichloride, diethylaluminum chloride, and the like.

A typical catalyst system for the polymerization or copolymerization of alpha olefins is formed by combining the supported titanium-containing catalyst or catalyst component of this invention and an alkyl aluminum compound as a cocatalyst, together with at least one external modifier which typically is an electron donor and, preferably, is a silane. Typically, useful aluminum-to-titanium atomic ratios in such catalyst systems are about 10 to about 500 and preferably about 30 to about 300. Typical aluminum-to-electron donor molar ratios in such catalyst systems are about 2 to about 60. Typical aluminum-to-silane compound molar ratios in such catalyst systems are about 3 to about 50.

To optimize the activity and stereospecificity of this cocatalyst system, it is preferred to employ one or more external modifiers, typically electron donors, and including compounds such as silanes, mineral acids, organometallic chalcogenide derivatives of hydrogen sulfide, organic acids, organic acid esters and mixtures thereof.

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors also may be used.

Particular organic acids and esters are benzoic acid, halobenzoic acids, phthalic acid, isophthalic acid, terephthalic acid, and the alkyl esters thereof wherein the alkyl group contains 1 to 6 carbon atoms such as methyl chlorobenzoates, butyl benzoate, isobutyl benzoate, methyl anisate, ethyl anisate, methyl p-toluate, hexylbenzoate, and cyclohexyl benzoate, and diisobutyl-phthalate as these give good results in terms of activity and stereospecificity and are convenient to use.

The aforesaid cocatalyst system advantageously and preferably contains an aliphatic or aromatic silane external modifier. Preferable silanes useful in the aforesaid cocatalyst system include alkyl-, aryl-, and/or alkoxy-substituted silanes containing hydrocarbon moieties with 1 to about 20 carbon atoms. Especially preferred are silanes having a formula: $SiY_4$, wherein each Y group is the same or different and is an alkyl or alkoxy group containing 1 to about 20 carbon atoms. Preferred silanes include isobutyltrimethoxysilane, diisobutyldimethoxysilane, diisopropyldimethoxysilane, n-propyltriethoxysilane, isobutylmethyldimethoxysilane, isobutylisopropyledimethoxysilane, dicyclopentyldimethoxysilane, tetraethylorthosilicate, dicyclohexyldimethoxysilane, diphenyldimethoxysilane, di-t-butyldimethoxysilane, and t-butyltrimethoxysilane.

In one aspect of this invention the substituted cycloalkane dicarboxylates identified above as catalyst component internal donors may be used as external donors alone or in combination with other suitable external donors including the above-identified silane compounds.

The catalyst or catalyst component of this invention is useful in the stereospecific polymerization or copolymerization of alpha-olefins containing 3 or more carbon atoms such as propylene, butene-1, pentene-1,4-methylpentene-1, and hexene-1, as well as mixtures thereof and mixtures thereof with ethylene. The catalyst or catalyst component of this invention is particularly effective in the stereospecific polymerization or copolymerization of propylene or mixtures thereof with up to about 30 mole percent ethylene or a higher alpha-olefin. According to the invention, highly crystalline polyalpha-olefin homopolymers or copolymers are prepared by contacting at least one alpha-olefin with the above-described catalyst or catalyst component of this invention under polymerization or copolymerization conditions. Such conditions include polymerization or copolymerization temperature and time, pressure(s) of the monomer(s), avoidance of contamination of catalyst, choice of polymerization or copolymerization medium in slurry processes, the use of additives to control homopolymer or copolymer molecular weights, and other conditions well known to persons skilled in the art. Slurry-, bulk-, and vapor-phase polymerization or copolymerization processes are contemplated herein.

The amount of the catalyst or catalyst component of this invention to be used varies depending on choice of polymerization or copolymerization technique, reactor size, monomer to be polymerized or copolymerized, and other factors known to persons of skill in the art, and can be determined on the basis of the examples appearing hereinafter. Typically, a catalyst or catalyst component of this invention is used in amounts ranging from about 0.2 to 0.02 milligrams of catalyst to gram of polymer or copolymer produced.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Olefin polymerization or copolymerization according to this invention is carried out at monomer pressures of about atmospheric or above. Generally, monomer pressures range from about 20 to about 600 psi (140 to 4100 kPa), although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Diluents suitable for use in slurry polymerization or copolymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkyl-naphthalenes; halogenated and hydrogenated aromatics such as chlorobenzene. Chloronaphthalene, ortho-dichlorobenzene, tetrahydro-naphthalene, decahydronaphthalene; high molecular weight liquid paraffins or mixtures thereof, and other well-known diluents. It often is desirable to purify the polymerization or copolymerization medium prior to use, such as by distillation, percolation through molecular sieves, contacting with a compound such as an alkylaluminum compound capable of removing trace impurities, or by other suitable means.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,786; 3,970,611; 4,129,701; 4,101,289; 3,652,527; and 4,003,712, all incorporated by reference herein. Typical gas phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For production of impact copolymers, homopolymer formed from the first monomer in the first reactor is reacted with the second monomer in the second reactor. A quench liquid, which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, and other common techniques.

The polymer component of the composition of this invention primarily contains a high crystalline polymer of propylene. Polymers of propylene having substantial polypropylene crystallinity content now are well-known in the art. It has long been recognized that crystalline propylene polymers, described as "isotactic" polypropylene, contain crystalline domains interspersed with some non-crystalline domains. Noncrystallinity can be due to defects in the regular isotactic polymer chain which prevent perfect polymer crystal formation. The extent of polypropylene stereoregularity in a polymer can be measured by well-known techniques such as isotactic index, crystalline melting temperature, flexural modulus, and, recently by determining the relative percent of meso pentads (% m4) by carbon-13 nuclear magnetic resonance ($^{13}$C NMR).

The propylene polymer especially useful in this invention has both a high nmr tacticity and a broadened molecular weight distribution ("MWD") as measured by the ration of the weight average to number average molecular weights ($M_w/M_n$). Such molecular weights typically are measured by gel permeation chromatography (GPC) techniques known in the art. In addition, preferable polymers of this invention have flexural moduli above about 1800 MPa and typically above about 2100 MPa. In addition the nmr pentad tacticity typically is above 90% and preferably is above about 95% and may be above about 97%. Typical polymer melt flow rates are 1 to 20 g/10 min.

A method to determine stereoregularity of a propylene polymer uses $^{13}$C NMR and is based on the ability to identify relative positions of adjacent methyl groups on a polypropylene polymer backbone. If the methyl groups of two adjacent propylene monomer units (—CH(CH$_3$)—CH$_2$—) are on the same side of the polymer chain, such two methyl groups form a meso ("m") dyad. The relative percentage of these meso dyads is expressed as % m. If the two methyl groups of adjacent monomer units are on opposite sides of the polymer chain, such two methyl groups form a racemic ("r") dyad, and the relative percentage of these racemic dyads is expressed as % r. Advances in $^{13}$C NMR techniques permit measurement of the relative positioning of three, four, and five successive methyl groups, which are referred to as triads, tetrads and pentads, respectively.

Current NMR instruments can quantify the specific distribution of pentads in a polymer sample. There are ten unique pentads which are possible in a propylene polymer:

| | |
|---|---|
| mmmm | rrrr |
| mmmr | mmrm |
| mmrr | mrrm |
| rmmr | rmrm |
| rmrr | mrrr |

A ball and stick representation of the mmmm pentad is:

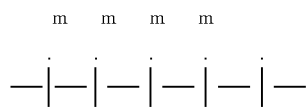

Two of the possible pentads cannot be separated by NMR (mmrm and rmmr) and are reported together. Two of the ten pentads (mmrr and mrrm) result from the displacement of a single methyl group on the opposite side of the polymer chain in an isotactic sequence. Since the mmmm (m4) pentad represents a perfect isotactic stereoregular structure, measurement of this pentad (as % m4) reflects isotacticity and potential crystallinity. As used herein, the term NMR tacticity index is the percent of m4 (% m4) pentads as measured by $^{13}$C NMR. Thus, if 96% of pentads measured by $^{13}$C NMR in a propylene polymer are m4, the NMR tacticity index is 96.

The invention described herein is illustrated, but not limited, by the following examples.

EXAMPLES

A series of supported catalyst components are prepared using various internal electron donors. Examples using electron donors of this invention are described below, together with Comparative Runs not using such internal electron donors.

Preparation of Donor Compounds

Preparation of donor modifier compounds are described below and in Table 1.

Ethyl(phenylacetoxy)acetate (M1) was obtained from Aldrich Chemical Co

TABLE 1

Structures of modifier derivatives used in Table 2.

| Name | Structure |
|---|---|
| Ethyl (phenylacetoxy)- acetate M1 | Ph–CH–O–C(=O)–O–C(H₂)–C(=O)–OEt |

TABLE 1-continued

Structures of modifier derivatives used in Table 2.

| Name | Structure |
|---|---|
| Di-n- butylphthalate M2 | n-BuO–C(=O)–(phenyl)–C(=O)–On-Bu |

Catalyst Preparations

Synthesis of Magnesium Chloride-THF Catalyst Support

A magnesium chloride-THF adduct catalyst support was prepared in a manner similar to that described in U.S. Pat. No. 4,946,816 by reacting a solution of one equivalent of magnesium ethoxide in a toluene solution containing 2-ethyl-1-hexanol with rapid agitation under 300 kPa of carbon dioxide at 93° C. for three hours under a blanket of dry nitrogen and contained approximately 0.1 gram equivalents of magnesium ethoxide per milliliter. The resulting magnesium hydrocarbyl carbonate solution was isolated and reacted with titanium tetrachloride (TiCl$_4$) (0.9 equivalents) in toluene and the solid particles precipitated. After the mixture containing the precipitate was stirred rapidly at about 25° C. for 15 minutes, magnesium hydrocarbyl carbonate solution was added to the reactor through a bomb and thereafter solid particles precipitated.

After the mixture containing the precipitate was stirred for five additional minutes, 0.25 equivalents of tetrahydrofuran (THF) were added rapidly. The rapid stirring was continued and the temperature was increased to 60° C. within 15 minutes. The first formed solid dissolved in the THF solution. Within about 5 minutes after the THF addition, a solid began to reprecipitate from solution. Stirring continued for 1 hour at 60° C. after which agitation was stopped and the resulting solid was allowed to settle. Supernatant was decanted and the solid washed with portions of toluene.

Synthesis of Catalysts.

Catalyst Preparation Procedure A:

Catalyst A1: A magnesium chloride-THF adduct catalyst support as described above (22.5 g) was suspended in 200 mL of heptane and transferred under nitrogen to a 1-liter jacketed glass reactor fitted with an overhead stirrer. The heptane was removed by decantation, the solids washed with toluene, which then was decanted. More of toluene was added, and titanium tetrachloride (TiCl$_4$) (105 mL, Akzo) was added with stirring. The reactor contents were warmed to 90° C. and mixed for an additional one hour. The alpha-hydroxy acid derivative donor modifier (M1) (2 mL) was added to the mixture by syringe, and the resulting mixture was stirred at 90° C. for one hour, and the solids were allowed to settle and supernatant decanted. Toluene and titanium tetrachloride (105 mL) were added and stirred at 100° C. An additional one mL of the same modifier was added by syringe, and the resulting mixture was stirred at 100° C. for one hour. The stirring was stopped, the solids were allowed to settle and the supernate was removed by filtration. Toluene was added and the slurry was stirred at 90° C. for 0.5 h. The solids were allowed to settle filtered and toluene (125 mL) and TiCl$_4$ (105 mL) were added, and the mixture was stirred at 90° C. for 0.5 h. The resulting solid was then washed with five 100 mL portions of heptane. The solids were slurried in heptane (100 mL), transferred to a glove box, filtered on a sintered glass frit, and dried with a stream of nitrogen, resulting in a fine, pale green powder (approximately 12 g). The solid contained, by weight: 4.09% Ti, 20.2% Mg, content by Inductively-Coupled Plasma (ICP). The powder had a uniform particle shape as judged by microscopy and a uniform distribution, $d_{10}$=12.05, $d_{50}$=28.82, $d_{90}$=57.28 microns and span=1.57 as measured by a Malvem Mastersizer™ laser diffraction particle size analyzer. This Catalyst A1 was used in Examples 4 and 5.

Catalyst Preparation Procedure B:

Preparation of Stripped Support. A Magnesium Chloride-THF Adduct Catalyst support as described above (22.5 g) was suspended in heptane and transferred under nitrogen to a 1-liter jacketed glass reactor fitted with an overhead stirrer. The heptane was removed by decantation, and washed with toluene for one minute with stirring, the solids recovered by decantation, and more toluene (125 mL) and titanium tetrachloride (105 mL, Akzo) were added with stirring. The reactor contents were warmed to 95° C. and mixed for an additional 1.25 hour, the stirring was stopped, and the solids were allowed to settle. The supernate was decanted, and the remaining solids were slurried in toluene (125 mL). The stirring was stopped, the solids were allowed to settle, and the supernate was removed by filtration. The solids were slurried in heptane (100 mL), transferred to a glove box, filtered on a sintered glass frit, and dried with a stream of nitrogen. A bright pink solid (12.0 g) was isolated. The solid contained, by weight, 3.2% Ti, 18.0% Mg, and 5.35% THF.

Activation of Stripped Support. Catalyst B1. A disposable 30 mL vial was charged with the stripped support prepared above (0.10 g, 0.74 mmol Mg), toluene (2 mL), donor modifier M2 (15 mg), and $TiCl_4$ (1 mL). The vial was placed in a rack, which was set on top of a heating block and heated to 95 C for 15 min with intermittent agitation. The solids were allowed to settle and the supernate was removed. Toluene (2 mL) and $TiCl_4$ (0.5 mL) was added, and the mixture heated again to 95° C. for 10 min. After allowing the solids to settle, the supernate was removed, and the residue was washed while still warm with toluene (2 mL), followed by three washes with hexane (2 mL each). The vial was set on its side to dry to constant weight in the dry box atmosphere and then capped until used for polymerization.

Catalyst B2. Procedure B, above, was used, but using 20 mg of modifier M1 and 0.25 mL of $TiCl_4$.

Catalyst B3. Procedure B was used, but in the first $TiCl_4$ treatment, no modifier was used and the mixture was heated to 60° C. for one hour, and in the second $TiCl_4$ treatment, 10 mg of modifier M1 was used and the mixture was heated to 80. C for one hour.

Comparative Catalyst Y1. Procedure B, above, was employed, but no modifier was used in the preparation.

Comparative Catalyst Y2. Procedure B, above, was employed, but modifier di-n-butyl phthalate (M2) (15 mg) was used in the $TiC_{1-4}$-treatments.

Catalysts used in Examples 5-8 and Comparative Runs B and C were prepared using similar procedures and are further described in Table 1.

Propylene Polymerizations.

Condition A: Standard 2 L, Heptane Slurry. A standard propylene polymerization is conducted using catalyst A1 in a nitrogen purged jacketed 2-liter stainless steel Parr reactor fitted with overhead stirrer, flush-bottomed dump valve, and equipped with temperature control. To the reactor is added 2.0 mL of a 1.25 M heptane solution of triethylaluminum, 2.0 mL of a 0.125 M heptane solution of diisobutyldimethoxysilane, 20 mg of catalyst, and 850 mL of heptane. The slurry is stirred at 500 rpm at 38° C. Hydrogen (9 mmol) was added, followed immediately by 30 g of liquid propylene. The reactor is warmed and the pressure was increased to 560 kPa with propylene when the temperature reached 71° C. (after about 15 min). The reactor is maintained at 71° C., 560 kPa, and 500 rpm for 60 min. The propylene supply is then turned off and the reactor vented over five minutes until the pressure was about 85 kPa. The reactor is pressurized to 305 kPa with nitrogen and then vented twice to remove residual propylene. The reactor is again pressurized to 305 kPa with nitrogen and the reactor slurry transferred through the bottom dump valve into a filter sock. The heptane-wet solid obtained in the filter sock is transferred to a glass dish and the solid is dried in a vacuum oven for one hour at 82° C. at 0.15 bar with slight purge of nitrogen, and white polypropylene powder is obtained.

Condition B: 300 cc Parr, Bulk Propylene. Polymerization Example 1. Propylene polymerization was conducted in a nitrogen purged jacketed 300 mL stainless steel Parr reactor fitted with overhead stirrer and equipped with temperature control. The reactor was brought to about 55° C. and charged with 1.0 mL of a 0.75 M heptane solution of triethylaluminum, 1.0 mL of a 0.1 M heptane solution of diisobutyldimethoxysilane, catalyst B2 (7.3 mg), liquid propylene (approximately 200 mL) and hydrogen (5.7 mmol). The reactor was brought to 71° C. while stirring at 500 rpm. After 60 min, the temperature control was shut off, the propylene was slowly vented, and the reactor was back-filled twice with nitrogen. The polymer was removed from the reactor and air-dried overnight. White polypropylene powder (33 g) was obtained.

Ex. 2 Condition B was employed, but Catalyst B2 (4.7 mg) was substituted for Catalyst B1, 9 mmol of hydrogen were used, and 40 grams of white polypropylene powder were obtained.

Ex. 3. Condition B was employed, but substituting Catalyst B3 (6 mg) for Catalyst B1, 6.5 mmol of hydrogen were used, and 39 grams of white polypropylene powder were obtained.

Ex. 4. Condition B was employed, but Catalyst A1 (6.1 mg) was substituted for Catalyst B1, and 24 grams of very sticky polypropylene powder were obtained.

Ex. 5. Condition B was employed, but Catalyst A1 (8.9 mg) was substituted for Catalyst B1, and 52 grams of white polypropylene powder were obtained.

Comparative Run A. Condition B was employed, but Comparative Catalyst Y1 (3 mg) was substituted for catalyst B1, and only 0.25 mL of the diisobutyldimethoxysilane solution was used, and 74 grams of very sticky polypropylene were obtained.

Comparative Run B. Condition B was used, but Comparative Catalyst Y2 (3 mg) was substituted for catalyst B1; 0.25 mL of diisobutyldimethoxysilane solution, 11 mmol of hydrogen was used; and the polymerization time was 72 minutes, and 65 grams of polypropylene powder were obtained.

Table 2 summarizes the polymerization and polymer properties.

TABLE 2

| Ex. (Run) | Catalyst Preparation | | | | Polymerization | | | | | |
|---|---|---|---|---|---|---|---|---|---|---|
| | Catalyst | Modifer* | Ti (wt %) | Mg (wt %) | Condition | Yield (gPP/g cat) | MFR (g/10 min) | Bulk Density (g/cc) | Xylene Sol. (wt. %) | Heptane Extrac. (wt. %) |
| 1 | B1 | M1 | n.d. | n.d. | B | 5600 | 6.7 | n.d. | 13.6 | n.d. |
| 2 | B2 | M1 | n.d. | n.d. | B | 8500 | 4.2 | n.d. | n.d. | n.d. |
| 3* | B3 | M1 | n.d. | n.d. | B | 6500 | 3.5 | n.d. | 15.6 | n.d. |
| 4 | A1 | M1 | n.d. | n.d. | B | 3900 | 1.3 | n.d. | n.d. | 14.8 |
| 5 | A1 | M1 | n.d. | n.d. | B | 5800 | n.d. | n.d. | n.d. | n.d. |
| (A) | Y1 | (none) | n.d. | n.d. | B | 24700 | 10.0 | n.d. | 38.6 | 49.2 |
| (B) | Y2 | M2 | n.d. | n.d. | B | 18100 | 9.4 | n.d. | 6.4 | 8.4 |

*M1 = Ethyl (phenloxy)acetate
M2 = Di-n-butyl phthalate
n.d. = not determined

"Yield" (grams of polymer produced per gram of solid catalyst component) is de based on the weight of solid catalyst-used to produce polymer. "Solubles" are determined by evaporating the solvent from an aliquot of filtrate to recover the amount of soluble polymer produced and are reported as the weight percent (% Sol.) of such soluble polymer based on the sum of the weights of the solid polymer isolated by filtration and of the soluble polymer. "Xylene Solubles" ("XS") are Solubles using boiling xylenes as the solvent. "Extractables" are determined by measuring the loss in weight of a dry sample of ground polymer after being extracted in boiling n-heptane for three to six hours and are reported as the weight percent (% Ext.) of the solid polymer removed by the extraction. The bulk density (BD) is reported in units of grams per cubic centimeter (g/cc). The viscosity of the solid polymer was measured according to ASTM D1238 Condition L (2.16 kg@230° C.) and reported as the melt flow rate (MFR) in grams of polymer per 10 minutes.

Decalin Solubles ("DS") is a measure of hydrocarbon soluble and extractable materials, such as atactic, non-crystalline, and oligomeric components, contained in a propylene polymer and is useful in correlating a particular resin to desirable resin properties such as processing window. DS is determined by completely dissolving a 2.0-gram sample of polymer in 100 milliliters of Irganox 1076-stabilized (0.020 grams/liter) decalin (decahydronaphthalene) by warming the slurry to 165° C. and stirring the slurry for two hours. Once the polymer is dissolved, the solution is allowed to cool overnight (at least 16 hours). After the cooling period, the solution is filtered from the precipitated polymer. A measured portion of the solution is withdrawn and, after removing the decalin solvent, the resulting samples are completely dried in a 120° C. vacuum oven. The final dried samples are weighed to determine the amount of decalin-soluble polymer. Results are reported as a weight percent polymer remaining soluble in decalin.

That which is claimed is:

1. A process to polymerize propylene or a mixture of propylene and ethylene or a C4-C6 alpha-olefin, wherein the improvement comprises using a catalyst system containing a solid, hydrocarbon-insoluble, catalyst component useful in polymerizing olefins containing magnesium, titanium, and halogen and further containing an internal electron donor comprising ethyl (phenylacetoxy) acetate.

* * * * *